(12) United States Patent
Awatani

(10) Patent No.: US 9,796,307 B2
(45) Date of Patent: Oct. 24, 2017

(54) VEHICLE SEAT HAVING A BACKREST WITH A FAN AND A LUMBER PLATE

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventor: Tomohiro Awatani, Toyota (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 110 days.

(21) Appl. No.: 14/692,021

(22) Filed: Apr. 21, 2015

(65) Prior Publication Data

US 2015/0306999 A1    Oct. 29, 2015

(30) Foreign Application Priority Data

Apr. 25, 2014    (JP) ................................ 2014-091061

(51) Int. Cl.
*B60N 2/56* (2006.01)
*B60N 2/66* (2006.01)

(52) U.S. Cl.
CPC ........... *B60N 2/565* (2013.01); *B60N 2/5635* (2013.01); *B60N 2/66* (2013.01); *B60N 2/6673* (2015.04)

(58) Field of Classification Search
CPC .... B60N 2/5635; B60N 2/565; B60N 2/5657; B60N 2/6671; B60N 2/663; B60N 2/66
See application file for complete search history.

(56) References Cited

U.S. PATENT DOCUMENTS

| 5,927,817 | A  | * | 7/1999  | Ekman  | B60N 2/56 297/180.14 |
|---|---|---|---|---|---|
| 7,607,739 | B2 | * | 10/2009 | Browne | B60N 2/5621 297/180.1 |
| 7,614,696 | B2 | * | 11/2009 | Colja  | B60N 2/66 297/284.4 |
| 8,226,166 | B2 | * | 7/2012  | Petzel | B60N 2/4415 297/284.1 |
| 2006/0087160 | A1 | * | 4/2006 | Dong | A47C 7/72 297/180.13 |

(Continued)

FOREIGN PATENT DOCUMENTS

| CN | 101804775 | 8/2010 |
|---|---|---|
| JP | 2003-165325 | 6/2003 |

(Continued)

OTHER PUBLICATIONS

Official Action, with partial English-language translation thereof, for JP Appl. No. 2014-091061 dated Apr. 12, 2016.

(Continued)

*Primary Examiner* — David R Dunn
*Assistant Examiner* — Tania Abraham
(74) *Attorney, Agent, or Firm* — Greenblum & Bernstein, P.L.C.

(57) ABSTRACT

A vehicle seat includes: a seat back having an upper frame; a fan provided in the seat back; a lumbar plate that is provided in the seat back and elastically supports a waist of a seated occupant from a rear side; and a support member that elastically supports the fan in an area at a height between the lumbar plate and the upper frame.

5 Claims, 6 Drawing Sheets

(56) References Cited

U.S. PATENT DOCUMENTS

| | | | |
|---|---|---|---|
| 2006/0175877 A1* | 8/2006 | Alionte | A47C 7/74 297/180.14 |
| 2009/0295200 A1 | 12/2009 | Ito et al. | |
| 2011/0062757 A1* | 3/2011 | Colja | B60N 2/6671 297/284.3 |
| 2011/0285189 A1 | 11/2011 | Petzel et al. | |
| 2012/0256451 A1* | 10/2012 | Sahashi | B60N 2/5635 297/180.14 |
| 2013/0300179 A1 | 11/2013 | Ota | |

FOREIGN PATENT DOCUMENTS

| | | |
|---|---|---|
| JP | 2009-291310 | 12/2009 |
| JP | 2010-188996 | 9/2010 |
| JP | 2013-233860 | 11/2013 |

OTHER PUBLICATIONS

Official Action, along with English language translation thereof, in CN Appl. No. 201510198449.8 dated Nov. 4, 2016.

* cited by examiner

VEHICLE SEAT HAVING A BACKREST WITH A FAN AND A LUMBER PLATE

INCORPORATION BY REFERENCE

The disclosure of Japanese Patent Application No. 2014-091061 filed on Apr. 25, 2014 including the specification, drawings and abstract is incorporated herein by reference in its entirety.

BACKGROUND OF THE INVENTION

1. Field of the Invention

The invention relates to a vehicle seat. Specifically, the invention relates to a vehicle seat provided with a fan in a seat back.

2. Description of Related Art

Conventionally, there is known a vehicle seat provided with a fan in a seat back (Japanese Patent Application Publication No. 2009-291310 (JP 2009-291310 A)). The fan is placed in an area surrounded by a frame of the seat back and is configured to send air to a backrest surface of the seat back via a duct.

In the above-described related art, the fan is provided so as to be directly attached to and firmly supported by the frame of the seat back. Therefore, in the event of a rear-side collision of a vehicle or the like, the fan may cause an uncomfortable feeling when the back of a seated occupant is pressed against the seat back.

SUMMARY OF THE INVENTION

The invention provides a vehicle seat in which a fan is provided in a seat back without reducing comfort of the vehicle seat.

An aspect of the invention relates to a vehicle seat including: a seat back having an upper frame; a fan provided in the seat back; a lumbar plate that is provided in the seat back and elastically supports a waist of a seated occupant from a rear side; and a support member that elastically supports the fan in an area at a height between the lumbar plate and the upper frame.

According to the above-described configuration, even in the case where the lumbar plate is provided in the seat back, the fan can be suitably disposed in a space within the seat back. When the back of the seated occupant is strongly pressed against the seat back, the fan elastically supported by a support portion can relieve the load. Therefore, even when the fan is provided in the seat back, the seat back hardly loses its comfort. Further, since the fan is elastically supported, vibration generated by the fan is less likely to be transmitted to the frame of the seat back.

The support member elastically may support only one side of the fan.

According to the above-described configuration, since the fan can easily tilt flexibly, vibration generated by the fan is further less likely to be transmitted to the frame of the seat back.

The support member may be a spring wire attached to a frame of the seat back via a vibration damping member, and the lumbar plate may be elastically supported by the spring wire.

According to the above-described configuration, vibration generated by the fan is further less likely to be transmitted to the frame of the seat back.

The spring wire may include a pair of left and right longitudinal wire portions extending in a height direction of the vehicle seat, and the fan may be attached to a back surface of a resin plate bridged between the longitudinal wire portions of the spring wire.

According to the above-described configuration, the fan can be provided without protruding forward from the lumbar plate and reducing comfort of the seat back 2.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinbelow, a mode for carrying out the invention will be described with reference to the drawings.

Figure 1:
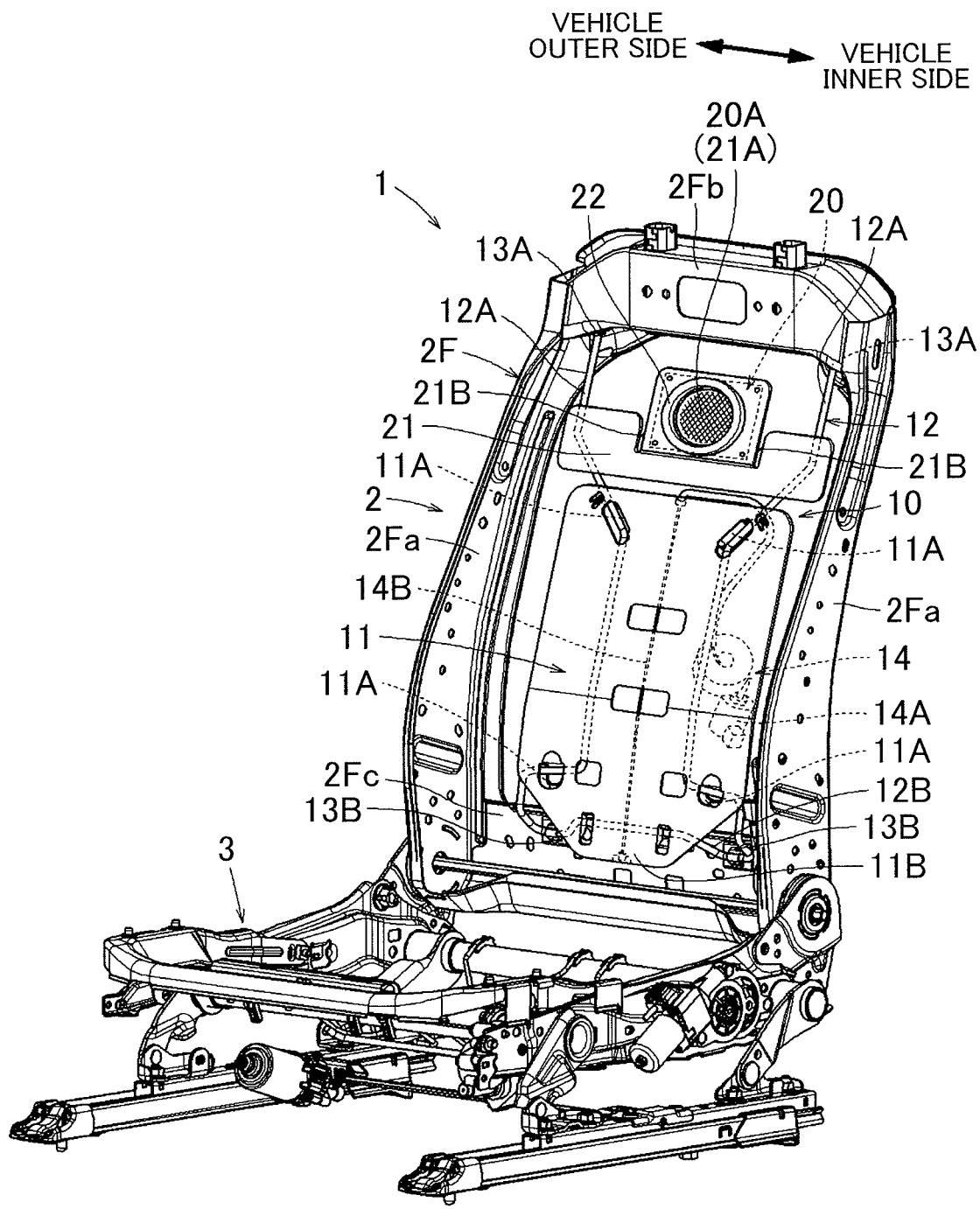
FIG. 1 is a perspective view showing a schematic configuration of a vehicle seat of a first embodiment.
Figure 2:
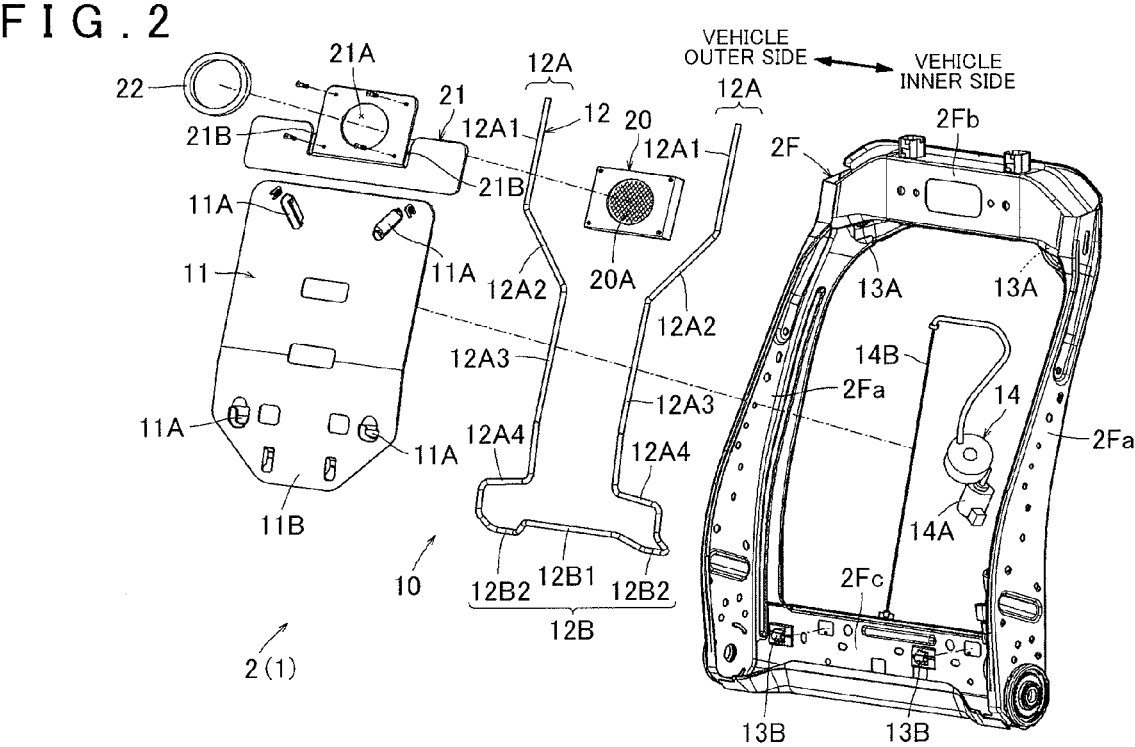
FIG. 2 is an exploded perspective view of a frame structure of a seat back.
Figure 3:
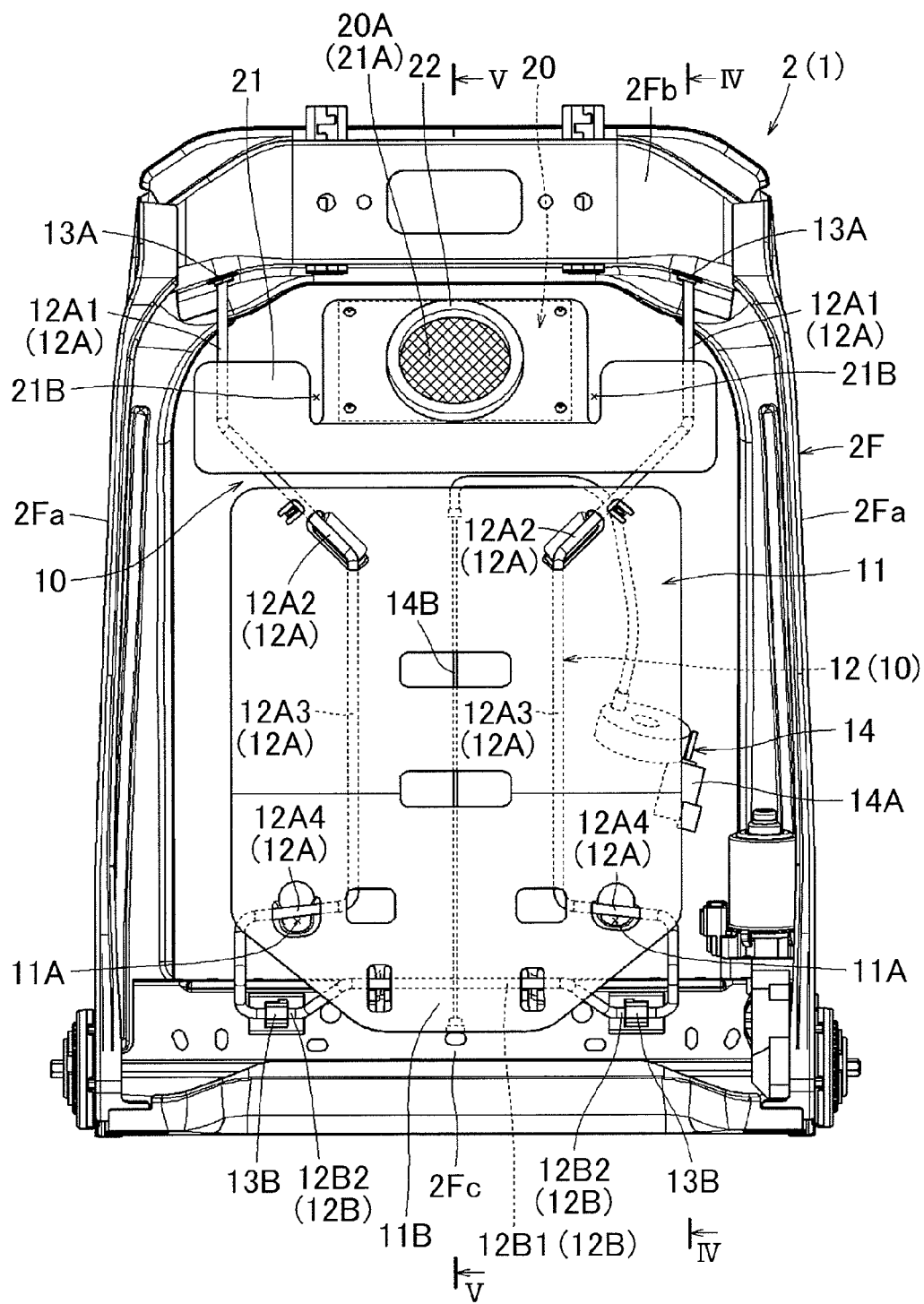
FIG. 3 is a front view of the frame structure of the seat back.
Figure 4:
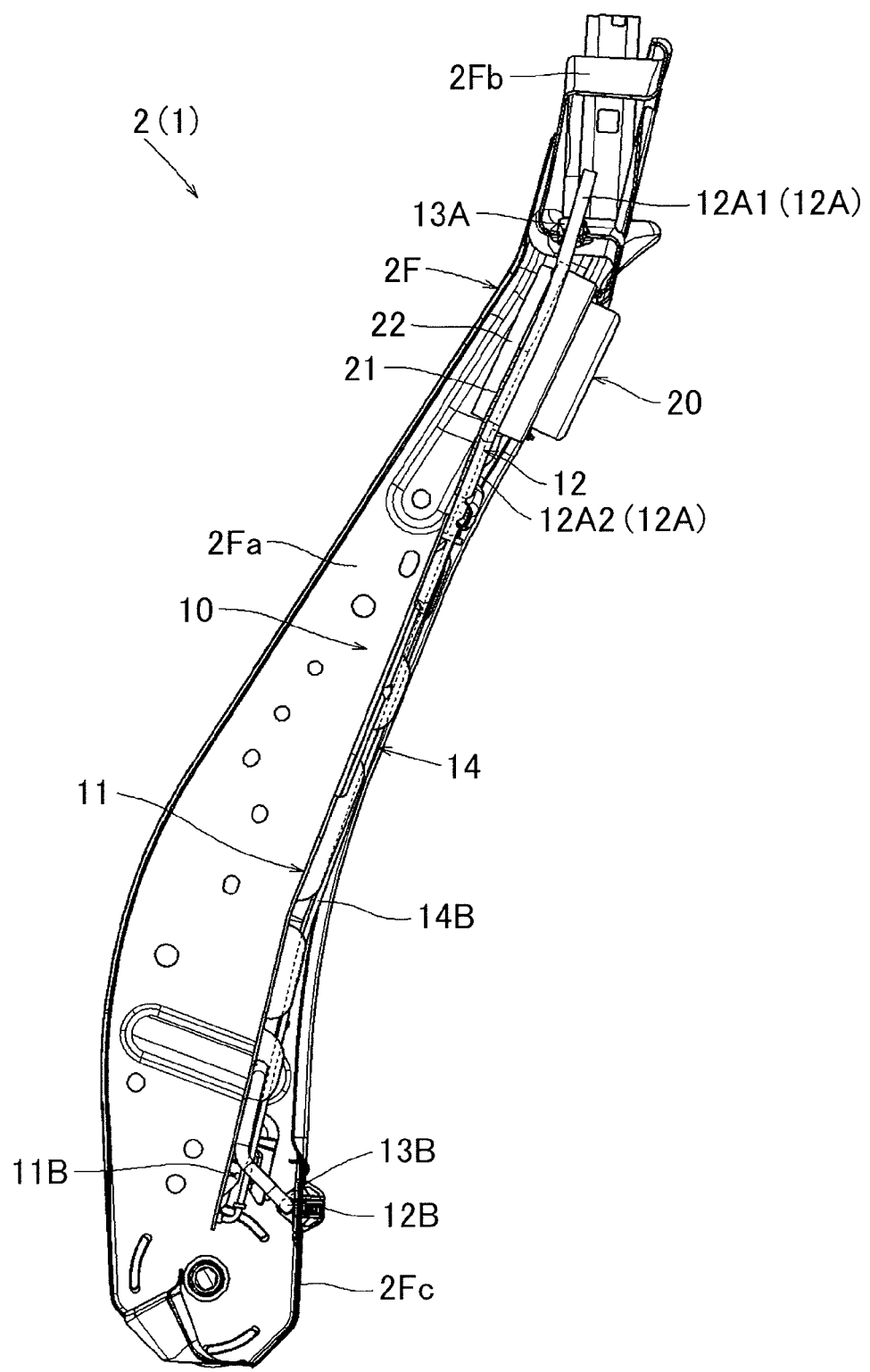
FIG. 4 is a sectional view taken along line IV-IV of FIG. 3.

First, a seat 1 of an embodiment will be described with reference to FIGS. 1 to 6. As shown in FIGS. 1 to 3, the seat 1 of this embodiment is configured as a driver's seat of an automobile and includes a seat back 2 serving as a backrest for a seated occupant and a seat cushion 3 serving as a seating portion. As shown in FIGS. 2 and 3, the seat back 2 has a back frame 2F forming a frame of the seat back 2. The back frame 2F has a pair of right and left side frames 2Fa, an upper frame 2Fb integrally bridged between upper end portions of the side frames 2Fa, and a lower plate 2Fc integrally bridged between lower end portions of the side frames 2Fa. The back frame 2F is formed in a generally rectangular frame shape as a whole in front view.

The side frames 2Fa are each formed of a single steel plate cut into a shape elongated in a height direction. The side frames 2Fa are disposed so as to face each other. Each side frame 2Fa has a shape in which front and rear edge portions are bent toward the seat inner side with their edges rounded. Thus, the edges portions of the side frames 2Fa is prevented from protruding outward, and the structural strength against bending or twisting is enhanced.

The upper frame 2Fb is formed by bending a single steel plate such that its transverse section (cross section in a direction perpendicular to a longitudinal direction) has an inverted U-shape. The upper frame 2Fb is laid between the upper end portions of the side frames 2Fa and is firmly and integrally joined to the side frames 2Fa by welding. Specifically, the upper frame 2Fb is welded to the side frames 2Fa in the state where right and left edge portions of front and rear surfaces of the upper frame 2Fb are placed in surface contact with surfaces of the front and rear edge portions of the right and left side frames 2Fa, bent toward the seat inner side. The edges portions of the upper frame 2Fb are thus covered by the side frames 2Fa from the outside, which prevents the edge portions from being exposed to the outside.

The lower plate 2Fc is formed by bending a single steel plate such that its transverse section has a J-shape. The lower plate 2Fc is laid between the lower end portions of the side frames 2Fa and is firmly and integrally joined to the side frames 2Fa by welding. Specifically, the lower plate 2Fc is welded to the side frames 2Fa in the state where surfaces of right and left edge portions of the lower plate 2Fc are placed in surface contact with the surfaces of the rear edge portions of the right and left side frames 2Fa, bent toward the seat inner side. The edges portions of the lower plate 2Fc are thus covered by the side frames 2Fa from the outside, which prevents the edge portions from being exposed to the outside.

The J-shape in the transverse section of the lower plate 2Fc is a shape that is curved along a rounded peripheral edge shape on the lower end side of each side frame 2Fa, and the lower plate 2Fc is attached to the side frames 2Fa such that a shape of the lower plate 2Fc conforms to the peripheral edge shape of the side frames 2Fa. With this configuration, the lower plate 2Fc is provided so as to be able to protect a recliner rod (not shown) from the lower side. The recliner rod is a rod for coupling right and left recliners and is provided so as to extend between the lower end portions of the side frames 2Fa.

In the rectangular back frame 2F, a back spring 10 is provided for elastically flexibly receiving a backrest load of the seated occupant applied to the seat back 2. As shown in FIGS. 2 and 3, the back spring 10 includes a lumbar plate 11 formed of a resin plate and a spring wire 12 formed by bending a steel wire into a generally U-shape. The lumbar plate 11 has a shape with its surface widely spreading in height and seat width directions in the rectangular back frame 2F in order to widely support from the rear side an area of the seated occupant from the waist, which is subjected to a strong body pressure from the back, to the middle of the back.

The spring wire 12 is formed by bending a single steel wire into a generally U-shape that conforms to the outer peripheral shape of the lumbar plate 11. The spring wire 12 is integrally attached to the lumbar plate 11 such that a plurality of portions of the spring wire 12 are respectively fitted to back-surface portions of the lumbar plate 11. The spring wire 12 includes a pair of left and right longitudinal wire portions 12A extending in the height direction. The later-described first longitudinal pieces 12A1 of the longitudinal wire portions 12A are inserted into the upper frame 2Fb of the back frame 2F from the lower side, and thus the spring wire 12 is attached to the back frame 2F via resin clips 13A so as to be in the height direction (see FIG. 4). Herein, the clip 13A serves as a "vibration damping member".

The spring wire 12 includes on its lower side a lateral wire portion 12B extending in the seat width direction. The lateral wire portion 12B is bent into a three-dimensional stepped shape in which its middle portion 12B1 protrudes obliquely upward toward the front, and its side portions 12B2, on both left and right sides of the middle portion 12B1, protrude obliquely downward toward the rear. In order to properly support, from the rear side, areas of the shoulder blades and the waist of the seated occupant, which are subjected to strong body pressures from the back, the pair of left and right longitudinal wire portions 12A are bent into a shape in which the length (lateral width) of an upper area for supporting the shoulder blades is larger corresponding to the distance between the shoulder blades, while the length (lateral width) of a lower area for supporting the waist is smaller corresponding to the width of the waist.

More specifically, each longitudinal wire portion 12A has the first longitudinal piece 12A1 extending straight in the height direction, an inward bent piece 12A2 bent at a lower end the first longitudinal piece 12A1 to extend obliquely toward the seat inner side, a second longitudinal piece 12A3 bent at a lower end of the inward bent piece 12A2 to extend straight downward, and an outward bent piece 12A4 bent at a lower end of the second longitudinal piece 12A3 to extend toward the seat outer side and then bent downward.

The first longitudinal piece 12A1 of each longitudinal wire portion 12A is disposed in an area located by the side of the corresponding side frame 2Fa of the back frame 2F and near the seat outer side, while the second longitudinal piece 12A3 of each longitudinal wire portion 12A is disposed in an area located near the middle in the seat width direction of the back frame 2F. The lumbar plate 11 is attached to the longitudinal wire portions 12A from the front side so as to lie over the areas including the inward bent pieces 12A2, the second longitudinal pieces 12A3, and the outward bent pieces 12A4, excluding the first longitudinal pieces 12A1. Specifically, the lumbar plate 11 is attached to the spring wire 12 such that hook-shaped hooking portions 11A formed at the back-surface portions of the lumbar plate 11 hook the respective pieces of the first longitudinal pieces 12A1 from the rear side.

The lateral wire portion 12B connecting lower end portions of the pair of right and left longitudinal wire portions 12A is supported by the lower plate 2Fc of the back frame 2F such that the side portions 12B2, on both left and right sides of the middle portion 12B1, which are bent so as to protrude obliquely downward toward the rear are attached to the lower plate 2Fc from the front side via resin clips 13B, respectively. With this configuration, the spring wire 12 is rotatable using as its rotation centers the side portions 12B2 of the lateral wire portion 12B attached to the lower plate 2Fc while the longitudinal wire portions 12A are pushed and bent rearward. Herein, the clip 13B serves as a "vibration damping member".

Normally, the back spring 10 is held in the back frame 2F with the lumbar plate 11 being elastically pressed against a back-surface portion of a back pad (not shown) covering the front side of the back frame 2F by a spring force generated by the spring wire 12 bridged between the upper frame 2Fb and the lower plate 2Fc of the back frame 2F. Then, when a backrest load of the seated occupant is applied to the seat back 2 and a rearward pressing force is applied to the lumbar plate 11, the back spring 10 elastically flexibly receives this load while pushing and bending the spring wire 12 rearward in the manner described above.

Figure 6:
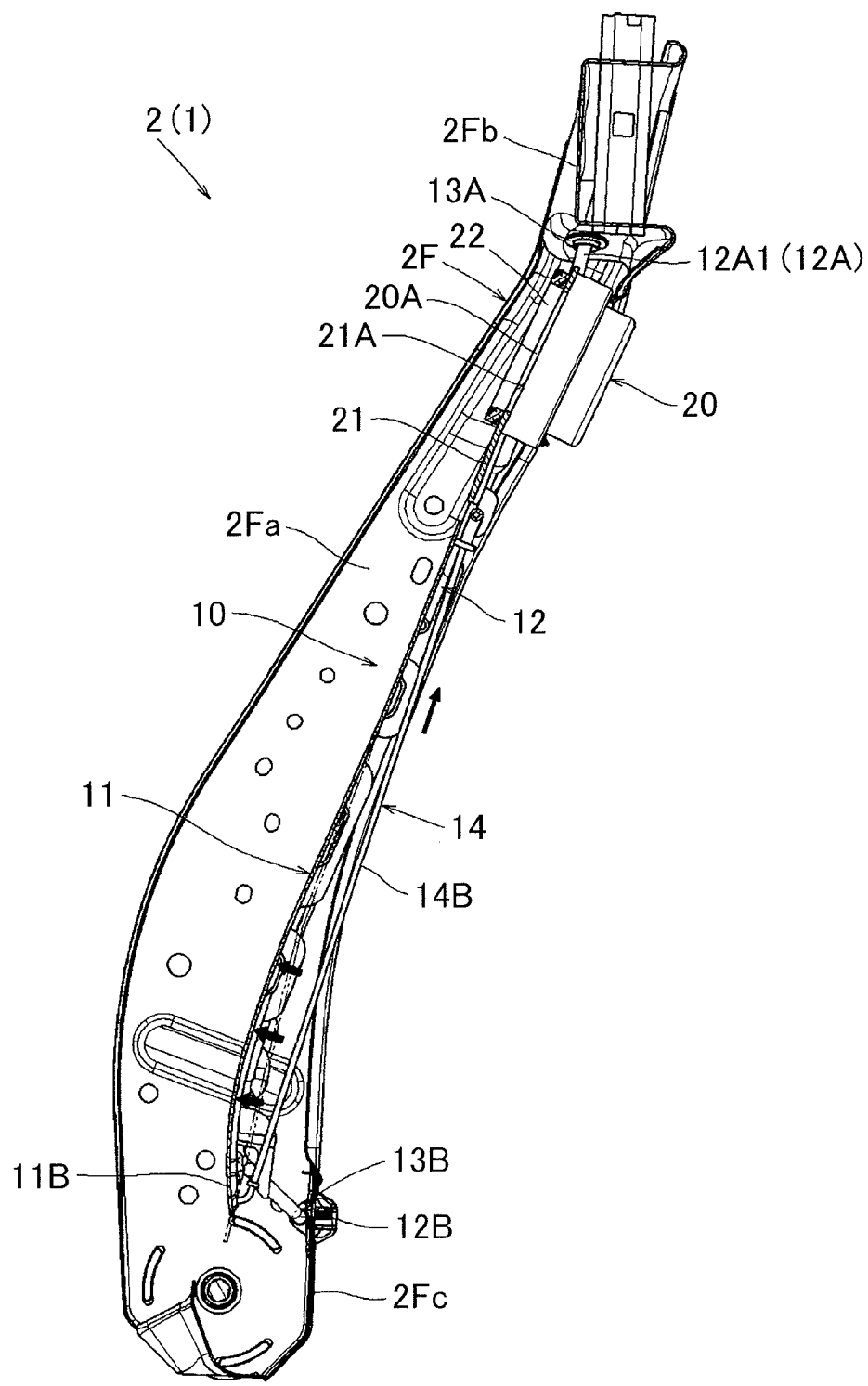
FIG. 6 is a perspective view showing a state where a lumbar plate is bent by a hardness adjustment mechanism.

Further, a hardness adjustment mechanism 14 is provided behind the back spring 10. The hardness adjustment mechanism 14 is capable of changing a support force for the waist of the seated occupant by changing the hardness of the lumbar plate 11. The hardness adjustment mechanism 14 is configured such that a cable 14B that is wound up or drawn out by driving an electric motor 14A is connected to a back-surface portion of a lower edge portion 11B located on the lower side of the lumbar plate 11. As shown in FIG. 6, the hardness adjustment mechanism 14 increases the hardness of the lumbar plate 11 by winding up the cable 14B by driving the electric motor 14A. At this time, the lower edge portion 11B of the lumbar plate 11 is pulled upward and the lumbar plate 11 is bent such that a middle portion of the lumbar plate 11 protrudes forward.

Figure 5:
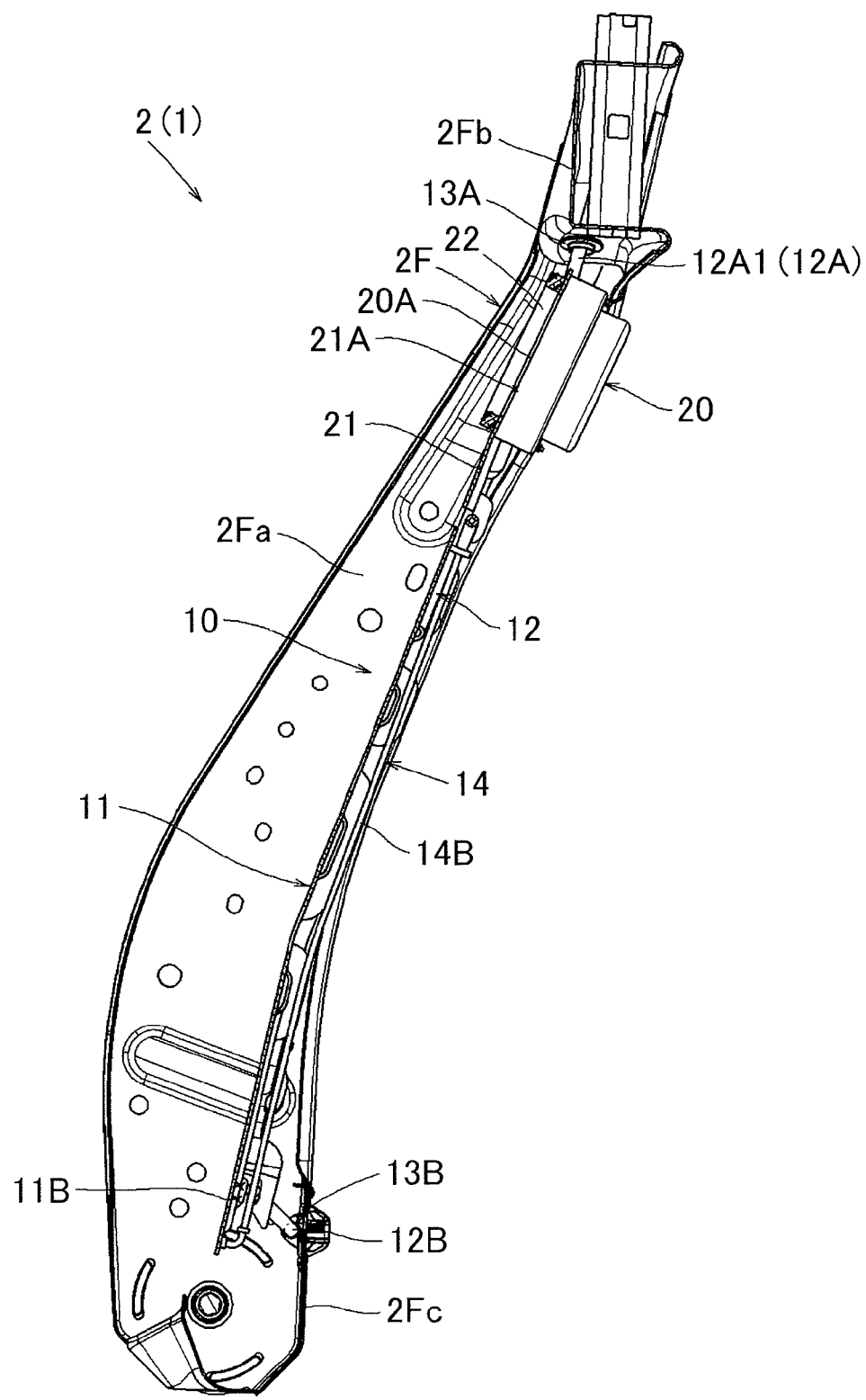
FIG. 5 is a sectional view taken along line V-V of FIG. 3.

As shown in FIGS. 1 to 3, a fan 20 is attached in an area at a height between the lumbar plate 11 of the back spring 10 and the upper frame 2Fb of the seat back 2 (i.e. an area above the lumbar plate 11 and below the upper frame 2Fb). The fan 20 is disposed in an area between the first longitudinal pieces 12A1 of the longitudinal wire portions 12A forming the spring wire 12 of the back spring 10. The fan 20 is attached to the longitudinal wire portions 12A via a resin plate 21 (made of polyacetal) in the state where an inlet port 20A of the fan 20 faces the front side. Specifically, as shown in FIGS. 2 and 5, the fan 20 is attached to a back-surface portion of the resin plate 21, and the inlet port 20A formed at a front-surface portion of the fan 20 is fitted into a circular through hole 21A formed in the resin plate 21 from the rear side. As shown in FIGS. 1 and 2, both right and left side portions of the resin plate 21 lie across the first longitudinal pieces 12A1 and the inward bent pieces 12A2 of the longitudinal wire portions 12A forming the spring wire 12, and are fixedly attached to the longitudinal wire portions 12A from the front side.

With this configuration, the fan 20 is attached to the back-surface portion of the resin plate 21 and elastically supported by the spring wire 12 in a state in which the fan 20 does not protrude forward from the spring wire 12. Further, the fan 20 is elastically supported only on its one side (i.e. elastically one-side supported) by the spring wire 12. Specifically, in the resin plate 21 attaching the fan 20 to the spring wire 12 is formed, slits 21B each extending from the upper edge side toward the lower edge side are formed on both sides of its middle area where the fan 20 is attached. Each slit 21B extends to a position corresponding to a lower edge portion of the fan 20 attached to the resin plate 21. With this configuration, the fan 20 easily tilts elastically in a forward-rearward direction, i.e. a thickness direction of the resin plate 21, about an end portion on the root side of the slits 21B. Herein, the spring wire 12 serves as a "support portion".

The fan 20 is attached to the spring wire 12 via the resin plate 21 as a member separate from the lumbar plate 11. Therefore, even when the lumbar plate 11 is bent to protrude forward by the hardness adjustment mechanism 14 or the lumbar plate 11 receives a backrest load to be pushed and bent rearward, the fan 20 is not affected by the bending deformation of the lumbar plate 11 and maintains the state where the fan 20 does not protrude forward from the spring wire 12. As a result, the seat back 2 does not lose its comfort.

A ring-shaped sealing member 22 made of urethane foam is attached to a front-surface portion of the resin plate 21 so as to cover the outer peripheral area of the through hole 21A. The sealing member 22 makes contact with a back-surface portion of the back pad to allow a connecting port of an air distribution duct formed at the back-surface portion of the back pad and the inlet port 20A of the fan 20 to communicate with each other. When the fan 20 thus attached operates, air in the air distribution duct of the back pad is sucked into the inlet port 20A formed at the front-surface portion of the fan 20 and, by its suction force, air passes between a backrest surface of the seat back 2 and the back of the seated occupant leaning against the backrest surface, which allows the seated occupant to feel coolness on his or her back.

To sum up the foregoing, the seat 1 of this embodiment is configured as follows. That is, the seat 1 is configured such that the fan 20 is provided in the seat back 2. The lumbar plate 11 capable of elastically supporting the waist of the seated occupant from the rear side is provided in the seat back 2. The fan 20 is elastically one-side supported in an area at a height between the lumbar plate 11 and the upper frame 2Fb of the seat back 2.

With this configuration, even in the case where the lumbar plate 11 is provided in the seat back 2, the fan 20 can be suitably disposed in a space within the seat back 2. When the back of the seated occupant is strongly pressed against the seat back 2, the fan 20 elastically one-side supported in the seat back 2 can tilt relatively flexibly to relieve the load. Therefore, even when the fan 20 is provided in the seat back 2, the seat back 2 hardly loses its comfort. Further, since the fan 20 is elastically supported, vibration generated by the fan 20 is less likely to be transmitted to the frame (back frame 2F) of the seat back 2.

The lumbar plate 11 is elastically supported by the spring wire 12 attached to the frame (back frame 2F) of the seat back 2 via the vibration damping members (clips 13A and 13B). The fan 20 is attached to and elastically supported by the spring wire 12. With this configuration, the vibration generated by the fan 20 is further less likely to be transmitted to the frame (back frame 2F) of the seat back 2.

The spring wire 12 includes the pair of left and right longitudinal wire portions 12A extending in the height direction. The fan 20 is attached to the back surface of the resin plate 21 bridged between the pair of right and left longitudinal wire portions 12A of the spring wire 12. With this configuration, the fan 20 can be provided without protruding forward from the lumbar plate 11 and reducing comfort of the seat back 2.

While the invention has been described with reference to one embodiment, the invention can be carried out in various embodiments in addition to the above-described embodiment. For example, "vehicle seat" of the invention can be applied to seats other than an automobile driver's seat and can be widely applied to seats for various vehicles such as railway vehicles, aircrafts, and ships.

As long as a fan is elastically supported in an area at a height between a lumbar plate and an upper frame of a seat back, the fan may be elastically supported by the lumbar plate or the upper frame. In this case, as a method for attaching the fan to an object with the fan being elastically supported, a attaching the fan to the object via a spring can be employed. In the above-described embodiment, the fan having the function of sucking air via the backrest surface of the seat back is shown by way of example. However, a fan having a function of sending air to the backrest surface of the seat back may alternatively be used.

A vibration damping member may be any member such as a resin member, a rubber member, or a cloth member as long as it can reduce vibration transmitted to the frame of a seat back from a spring wire by damping the vibration or preventing the vibration from being amplified, and therefore, it is not limited to a member made of a specific material.

In the case where a fan is elastically one-side supported in a cantilever manner in a seat back via a resin plate, the resin plate itself is not necessarily attached in a cantilever manner with respect to the seat back. It is satisfactory as long as the fan itself is provided so as to be elastically supported in a cantilever manner. That is, it may be configured that only a fan attaching portion of the resin plate is partially protruded so as to elastically support the fan in a cantilever manner or that the resin plate is slit so as to partition off a fan attaching portion in a cantilever manner, thereby elastically supporting the fan in a cantilever manner. In that event, the resin plate may be slit either laterally or longitudinally.

What is claimed is:
1. A vehicle seat comprising:
   a seat back having an upper frame;
   a fan provided in the seat back;
   a lumbar plate that is provided in the seat back and is configured to elastically support a waist of a seated occupant from a rear side; and a support member that elastically supports the fan in an area at a predetermined height between the lumbar plate and the upper frame, the support member including a support plate, wherein the fan is elastically supported by the support member, via the support plate, such that the fan is supported independently from the lumbar plate.

2. The vehicle seat according to claim 1, wherein slits that extend in a height direction of the vehicle seat are provided in the support plate, and only one side of the fan is elastically supported at respective end portions of the support plate that are provided at a root side of the slits.

3. The vehicle seat according to claim 1, wherein the support member further includes a spring wire attached to a frame of the seat back via a vibration damping member, and the lumbar plate is elastically supported by the spring wire.

4. The vehicle seat according to claim 3, wherein the support plate is a resin plate, the spring wire comprises a pair of left and right longitudinal wire portions extending in a height direction of the vehicle seat, and the fan is attached to a back surface of the resin plate and is bridged between the longitudinal wire portions of the spring wire.

5. The vehicle seat according to claim 4, wherein the resin plate is disposed above and spaced apart from an upper edge of the lumbar plate.

\* \* \* \* \*